(No Model.)

J. T. SMITH.
CYLINDER STOP.

No. 556,563.　　　　　　　　　Patented Mar. 17, 1896.

Witnesses:
J. H. Shumway
William D. Kelsey

John T. Smith
Inventor
By Attys
Earle Seymour

UNITED STATES PATENT OFFICE.

JOHN T. SMITH, OF ROCKFALL, CONNECTICUT.

CYLINDER-STOP.

SPECIFICATION forming part of Letters Patent No. 556,563, dated March 17, 1896.

Application filed November 5, 1894. Serial No. 528,001. (No model.)

*To all whom it may concern:*

Be it known that I, JOHN T. SMITH, of Rockfall, in the county of Middlesex and State of Connecticut, have invented a new Improvement in Revolvers; and I do hereby declare the following, when taken in connection with the accompanying drawings and the letters of reference marked thereon, to be a full, clear, and exact description of the same, and which said drawings constitute part of this specification, and represent, in—

Figure 1:
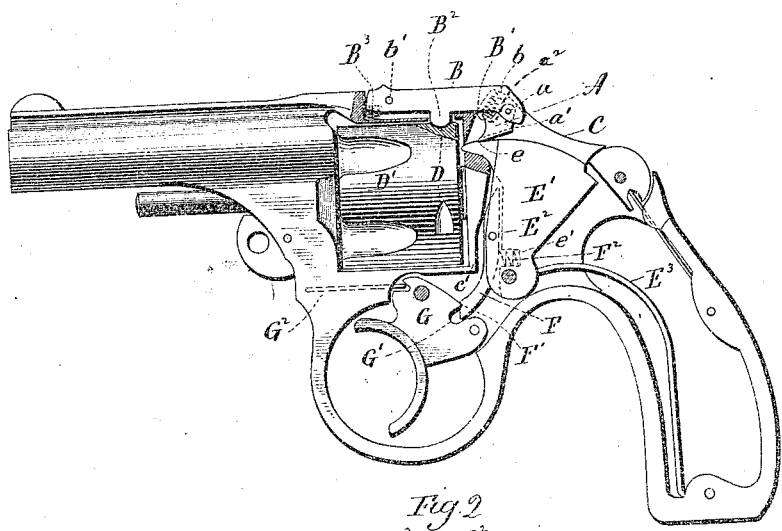
Figure 2:
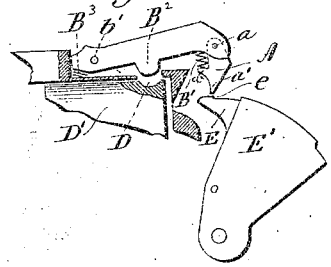
Figure 3:
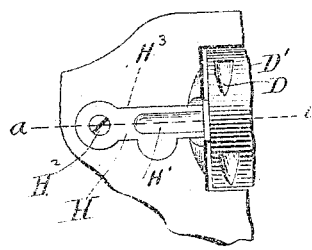
Figure 4:
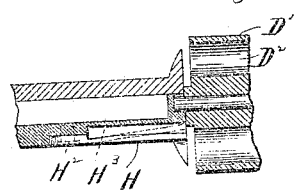

Figure 1, a view, partly in section and partly in inside elevation, of a revolver containing my invention; Fig. 2, a detached broken view showing how the cylinder-stop is lifted by the hammer through the medium of the pivotal releasing-dog for releasing the cylinder; Fig. 3, a broken view, in side elevation, of the other side of the arm, showing the cartridge-stop; Fig. 4, a broken view of the arm in horizontal section, through the cartridge-stop and cylinder, on the line $a\ b$ of Fig. 3.

My invention relates to an improvement in concealed-hammer revolvers, the object being to produce a simple, compact, durable, and effective arm constructed with particular reference to safety and reliability in use and convenience of manipulation.

With these ends in view my invention consists, first, in an improved positive stop for the cylinder; second, in an improved cocking-dog having the additional function of a rebounder, and, third, in an improved cartridge-stop which yields to permit the introduction of the cartridges into the cylinder and recovers to hold them therein.

In carrying out my invention, so far as it concerns the cylinder-stop, I suspend a small dog A from the lower face of the rear end of the positive cylinder-stop B by means of a pin $a$, the said dog being constructed at its lower end with a tooth $a'$ and upon its forward edge with a finger $a^2$, which receives the lower end of a spring B', located within a recess $b$, formed in the said end of the stop B, which, otherwise than described, is of ordinary construction and furnished midway of its length with a depending stop-finger B$^2$ and hung by its forward end in the strap of the frame C of the arm upon a horizontal pin $b'$. A spring B$^3$, located under the extreme forward end of the stop, is provided for operating the same, this spring being considerably heavier than the spring B' of the pivotal dog A. It will be understood that the depending stop-finger B$^2$ takes into notches D, formed in the periphery of the rear end of the rotating cylinder D', which is constructed in the usual manner, with a circular series of cartridge-chambers D$^2$. The tooth $a'$ of the dog A is arranged to take into a shallow notch $e$, extending transversely across the upper face of the firing-pin E, which, as herein shown, is made integral with the concealed-hammer E'; but I do not limit the use of my improved dog to a hammer provided with a firing-pin, as it may be used with any hammer, so long as the same is provided at some point with a notch for engagement with the dog, to cause the same to lift the stop when the hammer is retracted. It will be understood that when the hammer is drawn back the tooth of the dog is thrown by the action of the light spring B' of the dog into the notch $e$ in the firing-pin E, carried by the hammer E', which therefore acts through the medium of the dog to elevate the rear end of the stop and lift the stop-finger thereof out of contact with the cylinder D' which is thus released. When, on the other hand, the hammer moves forward, the firing-pin engages with the dog and readily pushes it out of the way against the tension of its spring B', which, however, is so light that it is compressed without disturbing the stop, which is maintained in its normal or active position by means of the heavier spring B$^3$.

I am thus enabled to make the spring B$^3$ heavy enough to prevent the stop from bounding and releasing the cylinder and still make it so light that the stop will work easily and be very sensitive. All this I accomplish by making the releasing or lifting movement of the stop positive under the action of the hammer in the rearward movement thereof.

The second feature of my invention is a cocking-dog F, which is located in a recess E$^2$, formed in the forward edge of the hammer, the lower end of this dog extending downward below the hammer in position to engage with the trigger G, and the dog being thereto constructed upon the forward face of its extreme lower end with a notch F', receiving a tooth G', formed upon the trigger. The said dog and trigger are further constructed and arranged so that as the trigger moves forward into its normal position it engages with the dog in such a manner as to move the hammer rearward just enough to clear the firing-pin E from the cylinder D. In this operation the trigger-spring $G^2$ overcomes the superior force of the hammer-spring $E^3$, and the reason why the trigger-spring can overcome the hammer-spring at this time is on account of the leverage obtained by the peculiar construction and arrangement of the parts, which is well shown in the drawings. The cocking-dog F is also provided with a spiral spring $F^2$ of its own, which is located in a chamber $e'$ formed to receive it in the lower end of the hammer. This spring holds the notched lower end of the dog in normal engagement with the tooth $G'$ of the trigger. Then, when the trigger is drawn backward, the cocking-dog spring holds the dog in engagement with the trigger until the forward edge of the lower end of the dog strikes the frame C at about the point $c'$, which causes the dog to be released from the trigger, whereby the hammer is released for its firing movement.

The third feature of my invention is a cartridge-stop H, which consists of a long narrow plate having a deep longitudinal groove $H'$, formed in the outer face of its forward end. A screw $H^2$ passing through the rear end of the plate secures the same within the rear end of a long narrow shallow recess $H^3$ formed in the frame of the revolver. When the plate is in its normal position, its forward end stands just behind the heads of the cartridges in the chambers $D^2$ of the cylinder $D'$. When, however, the cylinder is rotated to bring the chambers in line with the groove in the plate and pressure is applied to the stop, the cartridges may be pushed into or out of the chambers in the cylinder; but when the stop is not under pressure the inner end thereof stands in line with the heads of the cartridges, so as to hold them in place. By preference this cartridge-stop will be made of spring metal; but instead of that it might be hung loose enough upon the screw $H^2$ to have a little play, in which case I should provide it with a spring for holding it in its normal position.

In view of the changes suggested and of others which may obviously be made, I would have it understood that I do not limit myself to the exact construction shown and described, but hold myself at liberty to make such changes and alterations as fairly fall within the spirit and scope of my invention.

I am aware, however, that a cartridge-stop adapted to be pressed inward to permit cartridges to be fed into the chambers of a revolving cylinder is old, and I do not claim that construction broadly.

Having fully described my invention, what I claim as new, and desire to secure by Letters Patent, is—

1. In a concealed-hammer revolver, the combination with the cylinder and cylinder-stop thereof, of a hammer, and a releasing-dog pivotally mounted in the rear end of the stop, and adapted to be engaged by the hammer for lifting the dog, when the hammer is retracted, and swinging on its pivot for displacement by the hammer, without disturbing the stop, when the hammer is thrown forward, substantially as described.

2. In a concealed-hammer revolver, the combination with the cylinder and cylinder-stop thereof, of a releasing-dog pivotally mounted in the rear end of the stop, and a hammer provided with a firing-pin having a notch into which the lower end of the dog takes when the hammer is drawn back, for positively lifting the rear end of the stop for releasing the cylinder, the dog being displaced by the firing-pin without disturbing the stop when the hammer moves forward, substantially as described.

3. In a concealed-hammer revolver, the combination with the cylinder and the hammer thereof, of a cylinder-stop located above the cylinder, a spring for holding the said cylinder-stop in engagement with the cylinder, a releasing-dog pivotally mounted in the rear end of the stop, and adapted to be engaged by the hammer when the same is retracted, for lifting the stop to release the cylinder, and a spring mounted in the rear end of the stop and arranged to engage with the releasing-dog for throwing the same downward into the path of the hammer which engages with the dog, and swings the same out of the way, without disturbing the stop, when it is thrown forward, substantially as described.

4. In a revolver, the combination with the cylinder thereof, of a hammer constructed at the upper end of its forward edge with a rigid, forwardly-projecting firing-pin, a hammer-spring, a trigger, a trigger-spring, a cocking-dog pivotally mounted in the forward edge of the hammer, and adapted at its lower end to engage with the trigger, and also, at a point below its pivot, with the frame of the arm; and a cocking-dog spring for maintaining the lower end of the dog in engagement with the trigger, substantially as set forth, and whereby the trigger-spring, acting through the trigger, and cocking-dog, maintains the hammer, against the power of the spring thereof, in a rebounded position in which the said firing-pin clears the cylinder.

In testimony whereof I have signed this specification in the presence of two subscribing witnesses.

JOHN T. SMITH.

Witnesses:
 CHS. W. WARNER,
 HARRIS WARNER.